METHOD OF MANUFACTURING ENCAPSULATED ELECTRICAL UNITS

Original Filed May 23, 1957 3 Sheets-Sheet 1

*INVENTOR.*
ROBERT L. WHEARLEY
*BY* Toulmin & Toulmin
ATTORNEYS

Sept. 8, 1964 R. L. WHEARLEY 3,147,540

METHOD OF MANUFACTURING ENCAPSULATED ELECTRICAL UNITS

Original Filed May 23, 1957 3 Sheets-Sheet 2

*INVENTOR.*
ROBERT L. WHEARLEY

BY Toulmin & Toulmin

ATTORNEYS

Sept. 8, 1964 R. L. WHEARLEY 3,147,540

METHOD OF MANUFACTURING ENCAPSULATED ELECTRICAL UNITS

Original Filed May 23, 1957 3 Sheets-Sheet 3

INVENTOR.
ROBERT L. WHEARLEY

BY Toulmin & Toulmin

ATTORNEYS

United States Patent Office 3,147,540
Patented Sept. 8, 1964

3,147,540
METHOD OF MANUFACTURING ENCAPSULATED ELECTRICAL UNITS

Robert L. Whearley, Fort Wayne, Ind., assignor to Rea Magnet Wire Company, Inc., Fort Wayne, Ind.
Original application May 23, 1957, Ser. No. 661,169, now Patent No. 2,982,888, dated May 2, 1961. Divided and this application Nov. 4, 1960, Ser. No. 67,283
1 Claim. (Cl. 29—155.57)

This invention relates to encapsulated electrical components and particularly, to methods of manufacture thereof and is a division of my pending application, Serial No. 661,169, filed May 23, 1957, entitled Electrical Apparatus and Method of Manufacturing the Same, now Patent No. 2,982,888.

It is of importance with many electrical devices such as solenoids, resistors and armature receiving coils that the wire component be sealed both in order that constant electrical values may be maintained and the device be protected against the actions of moisture, vapors, and heat, for example.

A primary object of this invention is to provide an improved method making encapsulated components in which the encapsulating material may be either organic or inorganic.

A principal object of this invention is to provide novel methods of constructing encapsulated electrical components which the methods permit the usage of either inorganic or organic insulating materials.

A particular feature of the invention resides in the provision of a method of making encapsulated electrical components which are resistant to high temperatures, that is 400°–500° C. This is accomplished in the practice of the invention by utilizing inorganic electrical insulating materials of relatively high softening point.

In the preferred embodiment of the invention the encapsulated component is produced by winding wire into grooves of a sleeve, for example, the sleeve being constituted of electrical insulating material; over the first wound sleeve is placed a second sleeve in concentric relaship with the first, and this second sleeve is like-wise wound with wire to thus form a pair of windings in spaced insulated relation. The windings are so formed as to be connected in electrical series, and the turns of the wire are insulated from each other. As many such windings as is desired may be formed on concentrically disposed sleeves and thereafter the assembly operation is completed by the provision of a covering sleeve of ungrooved insulating material. The assembly is then supported in a mold body and heated sufficiently to cause the insulating material to assume a viscous, flowable state and the insulating material encloses and securely fixes the windings while sealing the assembly. Cooling and removal from the mold body provide a completed encapsulated unit.

The procedure lends itself to mass production methods both in assembly and sealing as will be noted from the detailed description set out hereinafter.

The invention will be more fully understood by reference to the following detailed description and accompanying drawings wherein.

In the practice of the invention the insulating material which supports and spaces the windings may as already noted be inorganic or organic. Thus siliceous materials such as glass and polymerizable plastics are employable. The invention will be described in specific relation to siliceous materials however as such afford a generally higher and desirable heat resistance.

Figure 1:
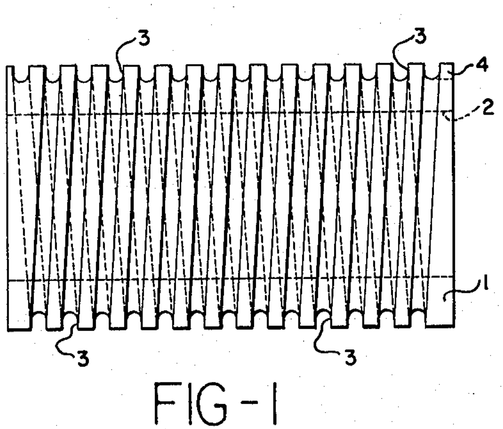
FIGURE 1 is a view of coil form used in the practice of the invention.
Figure 2:
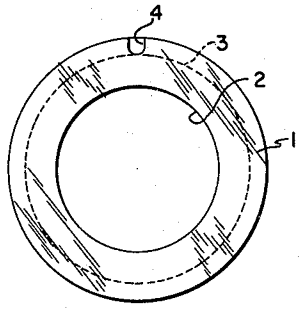
FIGURE 2 is an end view of the form of FIGURE 1.
Figures 3, 4, 5:
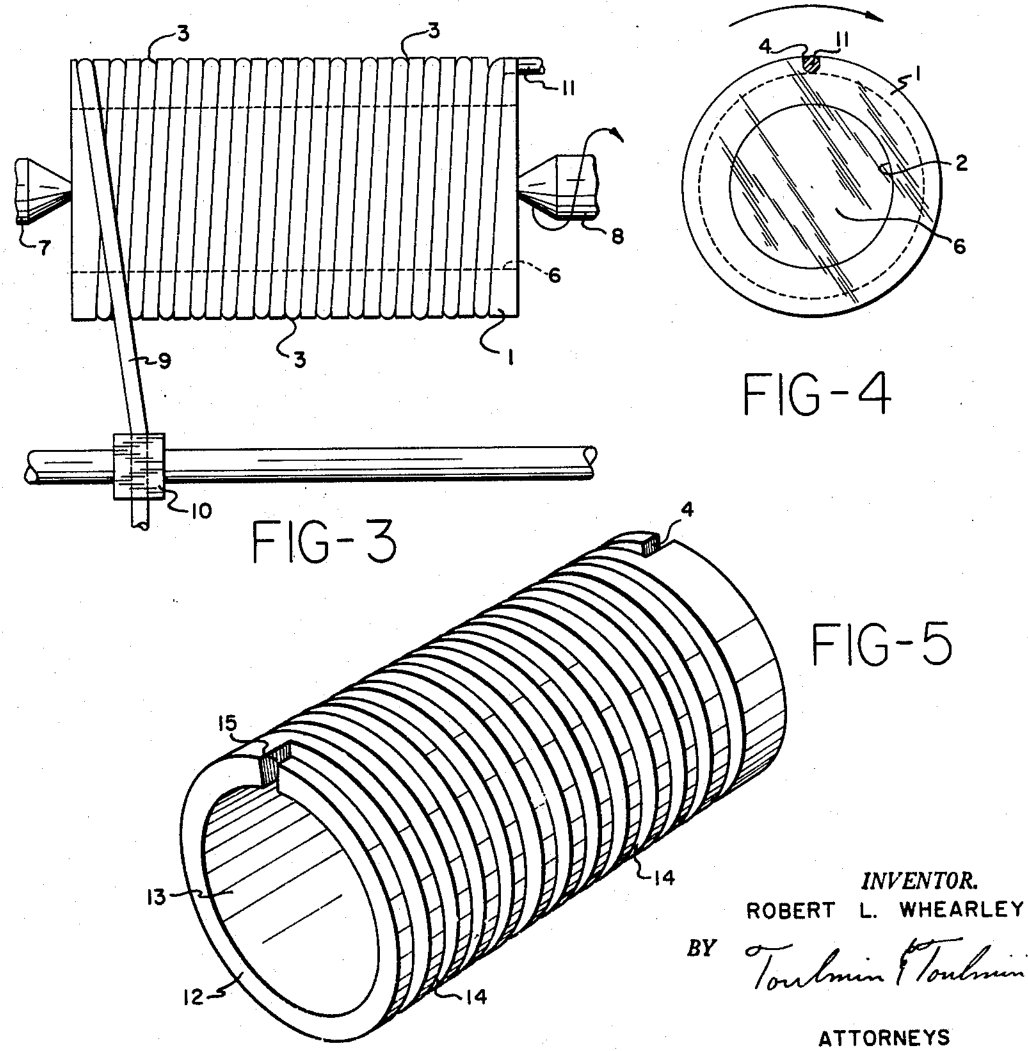
FIGURE 3 is a view illustrating the form of FIGURES 1 and 2 supported for rotation and with a winding of wire thereon.
FIGURE 4 is an end view of the wound coil form of FIGURE 3.
FIGURE 5 is a perspective view of a sleeve or second coil form which is adapted to be slid over the wound coil form of FIGURE 3.

Referring to the drawing the numeral 1 designates a sleeve of glass having an axial bore 2, and grooves 3 forming a spiral over the sleeve length. Rightwardly (FIGURE 1) the sleeve has an axial extending passage 4. As shown in FIGURE 3 the bore 2 receives a removable core 6 preferably of a metal of high melting point—and the sleeve is supported thereby for rotation on shafts 7, 8 which may respectively be associated with a head-stock and tail-stock of a lathe, for example.

Electrically conductive wire 9 is drawn from a suitable source (not shown) and applied by traverse mechanism indicated generally at 10 to the sleeve 1 as shown (FIGURES 3 and 4). The first end of the wire indicated at 11 extends through passage 4 and serves as a holding means in the winding operation; also wire end 11 functions as a lead in the end product. The grooves and wire diameter are so related that the wire lies in the grooves and does not protrude above the sleeve surface.

Each sleeve of the component may be wound separately and the windings then connected in series electrically by splicing the wires. However with the arrangement shown in FIGURES 3, 4 and 5 continuous winding may be effected. As shown in FIGURE 5 sleeve 12 has an axial bore 13, grooves 14 and is slotted through longitudinally at 15. Sleeve 12 as shown in the illustration also has a passage corresponding to the passage 4 of sleeve 1; where however more than 2 sleeves are employed the passages would normally appear only in the sleeve supporting the inner and outer windings and the remaining sleeves would be slotted through at both ends as at 15. Slot 15 is for the purpose for passing the wire continuously from the lower sleeve to the upper for winding formation on the upper sleeve.

The shaft 7 may be driven in either direction of rotation and accordingly the wire passing through slot 15 may be spiraled on the outer sleeve in a direction of the coil turns such that the turns are directly over those of the first sleeve or such that the turns are in an opposite direction to those of the first sleeve. By bringing wire 9 through slot 15 and maintaining the same direction of sleeve rotation as with the first sleeve the windings are in criss-cross relation on the two sleeves. With most wires the flexibility is such that the wire conforms readily to the sleeve contour; however if desired a drop of glaze on the wire at slot 15 will hold the wire appropriately positioned for winding in the left to right direction (FIGURE 6).

Alternatively, to secure a desired winding arrangement for a particular application the wound sleeve may be demounted and turned end to end before receiving the second sleeve which latter sleeve may have a sufficient length of axial slot as 15 to conveniently receive the wire and to pass the wound first sleeve.

The second sleeve 12 fits the first sleeve closely and may itself receive other wound sleeves thereon. As shown in FIGURE 7 however sleeve 12 receives a sleeve 17 of glass having no grooves and this sleeve serves as a covering sleeve.

Figures 6, 7, 10, 12:
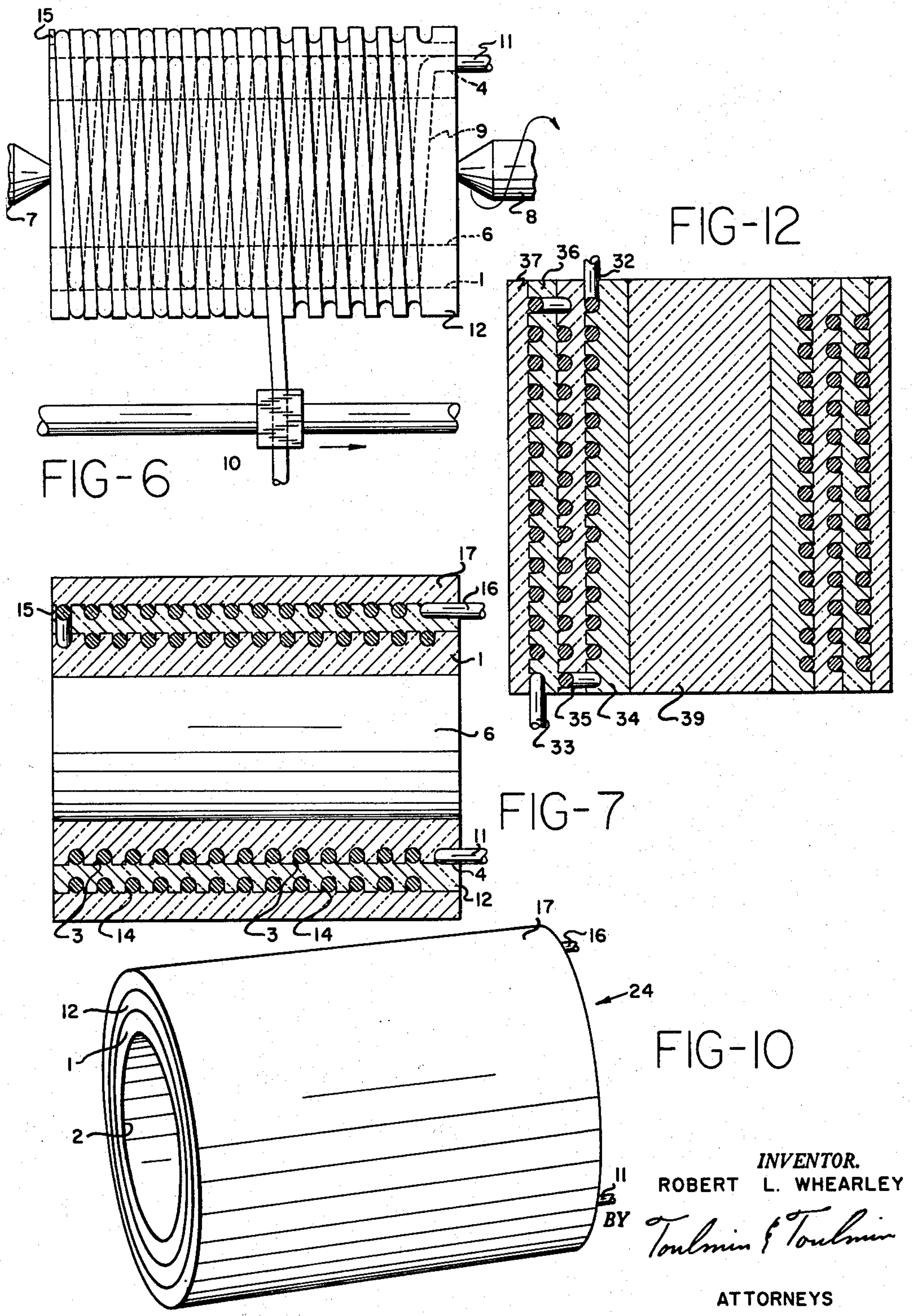
FIGURE 6 illustrates the coil form of FIGURE 5 in position and being wound.
FIGURE 7 illustrates an electrical component wound and ready to be placed in a mold body.
FIGURE 10 is a perspective view of an encapsulated component.
FIGURE 12 is a sectional view of yet another embodiment of the invention.
Figures 8, 9, 11:
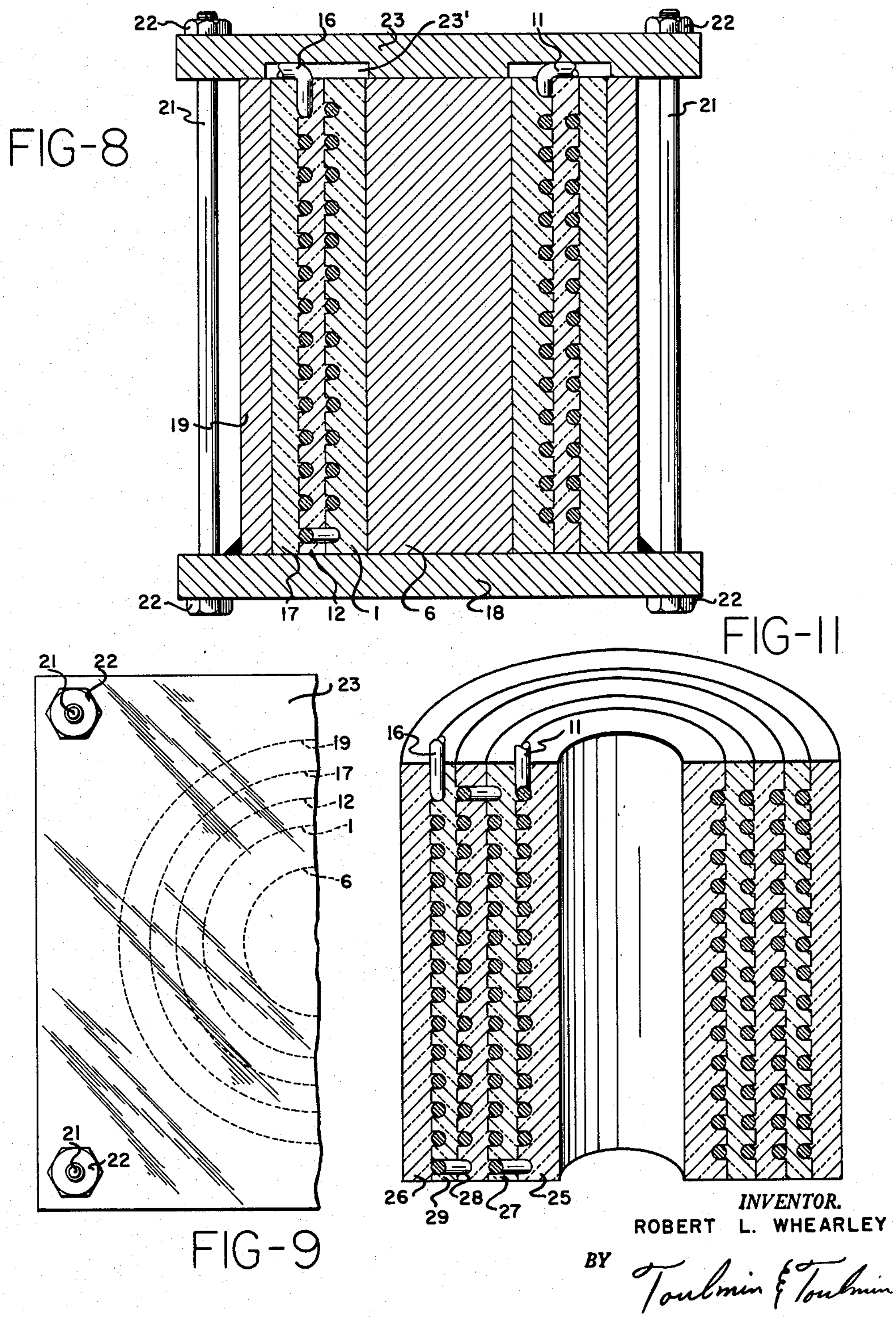
FIGURE 8 illustrates the structure of FIGURE 7 within a mold body.
FIGURE 9 is a fragmentary view of the structure of FIGURE 8 illustrating a mold end plate arrangement.
FIGURE 11 is a view partially in section of a further embodiment of the structure of invention.

The assembly of FIGURE 7 including the metal core 6 as shown in FIGURE 8 is slid into a mold body which comprises end plate 18; a tube 19 welded to plate 18 and adapted to receive the assembly in sliding engagement as shown; end plate 23; and threaded rods 21 which pass through the end plates and receive nuts 22 to securely retain the assembly on the mold body between the plates. Suitably end plate 23 is recessed at 23' to receive the wire ends or the ends may be passed out through plate 23.

The assembly, confined within the mold, is then placed within an oven and heated to a temperature sufficient to render the siliceous material or glass material of the sleeves at least viscous enough to flow about the conductor wires. Suitably for mass production a tunnel is provided and the assemblies within the mold bodies are passed through the tunnel on a conveyor.

Upon removal from the heat the assembly is cooled to about room temperature the mold removed and the core 6 taken from the assembly. The product will then appear as generally designated at 24 in FIGURE 10 and is a compact arrangement of windings in sleeved relationship insulated by the siliceous material peripherally and endwise but connected together in electrical series.

Glasses suitable for the product of invention may have softening points as low as 900° F. and preferably have thermal coefficients of expansion closely approaching that of the electrically conductive wire. Siliceous materials embodying relatively high percentages of lead oxide, boric oxide and alumina are useful as low softening point glasses; appropriate proportioning of such materials permits the attainment of substantially any desired thermal coefficient of expansion.

Borosilicates are also suitable, particularly the soft borosilicates having softening points of 1600° F.–1800° F.; the silica-lime-alumina system glasses may also be employed.

It is not necessary that a single electrically insulating material be employed. For example a low softening point glass may be utilized for an intermediate sleeve as 12 in FIGURE 8. The temperature then need only be raised to the softening point of this material to secure a complete seal for sleeve 12 when it becomes viscous will adhere to the wire of the windings and the solid sleeves 1 and 17. Care should be taken to inhibit flow to the recess 23' and for this reason it is desirable to heat the assembly with plate 23 uppermost. Any glass adhering to leads 11, 16 may be readily scraped therefrom. A combination of a lead glass and a soft borosilicate or a hard borosilicate may be thus employed, the borosilicates forming the inner and outer sleeves. Also other high softening point electrical insulating materials, the ceramics for example, may be employed in such a composite.

An embodiment having a greater plurality of concentric windings is shown in FIGURE 11. The product is constructed as described hereinbefore but comprises a winding on inner sleeve 25 of high softening point glass, an outer sleeve 26 also of relatively high softening point glass, and intermediate sleeves 27, 28, 29 each having windings thereon. Suitably sleeve 28 is also of high softening point glass while the sleeves 27, 29 are of low softening point material. Raising the temperature to an extent sufficient—that is 900° F. to 1300° F. to soften the material of sleeves 27, 29 is effective to enclose and seal the windings. Under this condition the high softening point materials such as the borosilicates remain solid during the heating and the turns of wire remain securely fixed during the heating.

Leads 11, 16 of the structure of FIGURE 11 extend from one end only of the component since the device is wound as described in connection with FIGURE 3 and has an even number of windings.

In the embodiment of FIGURE 12 the windings are an odd number and the leads 32, 33 extend from opposite ends. The sleeves with the windings thereon are designated by the numerals 34, 35, 36 and the outer sleeve is indicated at 37. The sleeves may be all of one softening point or the intermediate sleeve 35 may be of a different softening point than the bounding sleeves 34, 36. In this instance the component has a solid core of insulating material 39 and is suitable as a resistor. The glass 39 may be integral with the glass 34; or the glass 39 may be a low fusion point material deposited in the core hole after complete formation of the component and fused in place.

As already noted it is preferable that the encasing insulating material and the wire of the windings have approximately the same coefficients of thermal expansion. Such is desirable where the windings are to be operated under high temperature conditions in order to avoid strains in the encasing material. Suitable materials for the wire include copper, steel, nickel, silver, aluminum, aluminum coated silver, and copper coated alloys such as the nickel-iron alloys; a nickel-iron alloy containing about 48% by weight of nickel and 52% by weight of iron, copper clad if so desired is useful. No insulation coating is required on the wire itself in the practice of the invention; bare wire is employed but insulation may be employed as a coating where temperature and operating conditions permit.

The wire diameters useful range from the very fine to the large sizes of magnet wire for example from #50 American wire gauge (about .001") to #10 (about 0.1"). The bare wire may be wound as closely as the spacing of the grooves permit. While for the sake of clarity in the drawings the turns and number of windings have been limited it will be appreciated that the number of windings may be materially increased and the sleeved relationship of the windings to each other may be as close as the dielectric quality of the insulating material will allow without breakdown.

While power winding of the wire is desirable with all sizes of wire and the core 6 may be provided in a conventional manner on a shaft driven from the headstock of a lathe as indicated in FIGURE 3, hand winding may be readily accomplished.

Organic materials useful as the insulation include the resins particularly those which soften in heat and resolidify, for example, the styrenes, methyl methacrylates and vinyl acetates. In general the resins are utilizable where the final product is not subjected to excessive temperature conditions.

It will be understood that this invention is susceptible to modification in order to adapt it to different usages and conditions and accordingly, it is desired to comprehend such modifications within this invention as may fall within the scope of the appended claim.

I claim:

The method of constructing an encapsulated electrical component which comprises; winding an electrical conductor wholly within grooves on a rigid sleeve-like form of heat softenable electrical insulating material, placing a second rigid sleeve-like form of heat softenable electrical insulating material over the first wound form in telescoping relation, passing the said conductor through passages inwardly of the ends of said forms and winding said conductor wholly within grooves on said second form to form a continuous winding from said first form to said second form, placing a third rigid sleeve-like form of heat softenable electrical insulating material over said second form in telescoping relation, said second form being heat softenable at a temperature below the temperature at which the said first and third forms will soften, heating the assembled wound forms to at least the softening temperature of said second form to fuse the said forms into an integral mass of electrical insulating material, and thereafter cooling the sealed component.

References Cited in the file of this patent

UNITED STATES PATENTS

| | | |
|---|---|---|
| 812,657 | Kitsee | Feb. 13, 1906 |
| 1,281,744 | Abbott | Oct. 15, 1918 |
| 1,661,953 | McIntosh | Mar. 6, 1928 |
| 1,739,246 | Majce | Dec. 10, 1929 |
| 2,195,233 | Boyer | Mar. 26, 1940 |
| 2,392,790 | Webb | Jan. 8, 1946 |
| 2,707,693 | Dorst | May 3, 1955 |
| 2,982,889 | Whearley | May 2, 1961 |
| 2,988,804 | Tibbetts | June 20, 1961 |

FOREIGN PATENTS

| | | |
|---|---|---|
| 710,711 | Great Britain | June 16, 1954 |